United States Patent [19]

Singer

[11] 4,088,837
[45] May 9, 1978

[54] COMBINATION TELEPHONE AND CALCULATOR WITH COMMON KEYBOARD HAVING REVERSIBLE INDICIA

[76] Inventor: Thomas C. Singer, 302 S. Beverly Ave., Wheaton, Ill. 60187

[21] Appl. No.: 757,627

[22] Filed: Jan. 7, 1977

Related U.S. Application Data

[63] Continuation-in-part of Ser. No. 673,674, Apr. 5, 1976, abandoned.

[51] Int. Cl.² .................. H04M 1/21; H04M 1/23; H04M 11/00
[52] U.S. Cl. ................ 179/2 DP; 179/90 K; 197/98; 400/495
[58] Field of Search .............. 179/2 DP, 90 K; 340/365 R; 235/145 R; 197/4, 98, 102, 103, 104; 40/61 R

[56] References Cited

U.S. PATENT DOCUMENTS

3,627,936   12/1971   Cullen ........................... 340/365 R
3,879,722   4/1975    Knowlton ..................... 340/365 R

FOREIGN PATENT DOCUMENTS

2,163,007   6/1973   Germany ........................ 179/90 K

OTHER PUBLICATIONS

*IBM Technical Disclosure Bulletin*, vol. 12, No. 4, Sep. 1969, p. 622, "Quick Changeable Keytop Indicia," D. L. Potak.

*Primary Examiner*—George G. Stellar

[57] ABSTRACT

In a combination telephone set which includes a housing, a numerical keyboard disposed on the housing which has at least ten keys, and an electronic calculator contained within the housing, and wherein the keys are selectably useable as input means for the telephone set so as to generate a plurality of tones, and for the calculator so as to process data, and wherein at least ten indicia are disposed on each of the keys respectively, the improvement which includes selection means for reversibly changing at least one of the indicia disposed on at least one of the keys from operation as the input means for the telephone set to another of the indicia for operation as the input means for the calculator.

2 Claims, 9 Drawing Figures

COMBINATION TELEPHONE AND CALCULATOR WITH COMMON KEYBOARD HAVING REVERSIBLE INDICIA

This is a continuation-in-part application of my previous application, Ser. No. 673,674, filed Apr. 5, 1976 now abandoned.

BACKGROUND OF THE INVENTION

Field of the Invention

The field of the present invention relates to a combination telephone and calculator.

BACKGROUND OF THE INVENTION

A combination telephone and calculator is known which contains a common keyboard having numeric indicia thereon. The combination of a telephone set and a calculator has so far required, however, the use of a keyboard which forces on the user either the conventional telephone keyboard which starts on the first row with numerals 1 to 3, or the convention of the calculator which has on the first row of the keyboard the numerals 7, 8, 9, the lower numerals appearing in respective lower rows. A person who is used to operating a conventional telephone set as well as a conventional calculator is likely to make mistakes since he is now forced to use solely the keyboard of either the telephone or the calculator for the combination telephone and calculator set, which may lead to mistakes or errors.

SUMMARY OF THE INVENTION

It is accordingly an objective of my present invention to provide a combination telephone and calculator which has a numeric keyboard which the user can operate according to either the convention used in a telephone set, or the convention used in a calculator.

I accordingly provide in a combination telephone and calculator including a housing, a numeric keyboard disposed on the housing which has at least ten keys, and an electronic calculator within the housing, wherein the keys are selectably usable as input means for the telephone set to generate a plurality of tones, and for the calculator for the processing of data, and wherein at least ten indicia are disposed on the keys, respectively, the improvement which includes selection means for reversibly changing at least one of the indicia disposed on at least one of the keys from operation as the input means for the telephone set to another of the indicia for operation as the input means for the calculator. At least one of the keys has a central axis and includes top and bottom members. The indicia include first and second indicia and the selection means include a shaft which is coaxially aligned with the axis, and journaled between the members and a spoked wheel which is rotatable from a first position to a second position. The spoked wheel has a hub and a rim, and each of the spokes of the wheel has the shape of an isosceles triangle. Each of the openings formed between the spokes of the wheel has a shape substantially identical to the shape of each of the spokes. The wheel is fixedly attached to the shaft, and the top member is transparent. The bottom member has a side facing the top member, and has a broken-line shape of the first and second indicia disposed, or inscribed thereon. The first and the second indicia are visible through the transparent top member in the first and the second positions of the spoked wheel, respectively.

At least five of the ten keys are similar to the first of the keys; the first of the keys and the above-named five keys are disposed on the keyboard so as to form a set of keys which have a common periphery. An endless band is attached to the wheels of each of the set of the keys for moving the latter from the first position to the second position.

BRIEF DESCRIPTION OF THE DRAWINGS

My invention will be better understood with reference to the accompanying drawing in which.

DESCRIPTION OF THE PREFERRED EMBODIMENT

Figure 1:
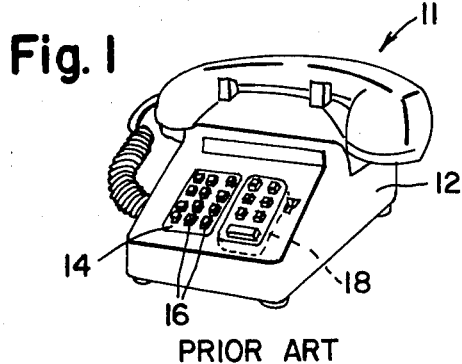
FIG. 1 shows a perspective view of a combination telephone and calculator of the prior art.
Figure 8:
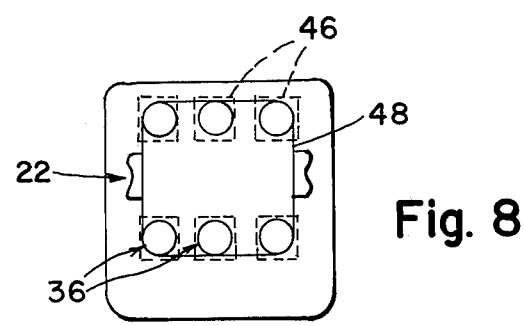
FIG. 8 corresponds to FIGS. 5 and 6, but with the wheel removed.
Figure 2:
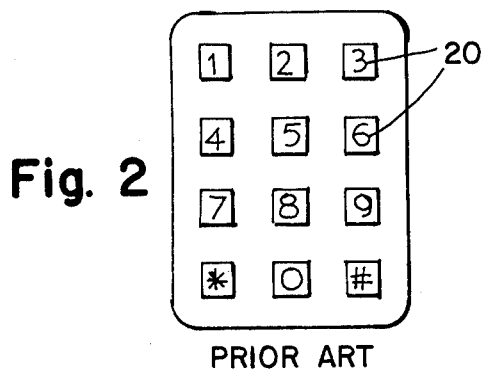
FIG. 2 shows a keyboard of the combination telephone and calculator of the prior art.
Figure 3:
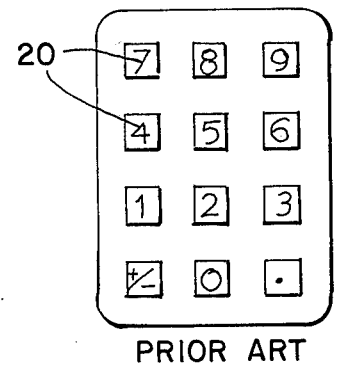
FIG. 3 shows the keyboard of a conventional calculator.
Figure 4:
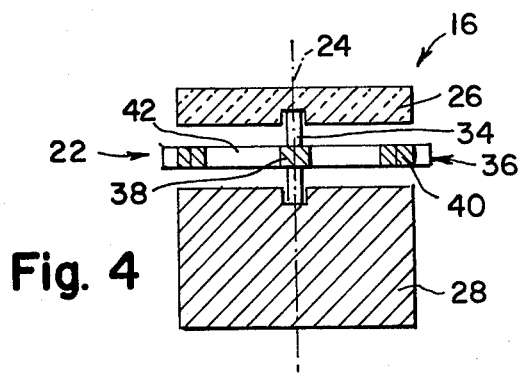
FIG. 4 shows a key of the combination telephone and calculator, according to my invention, in elevational cross-section.
Figure 5:
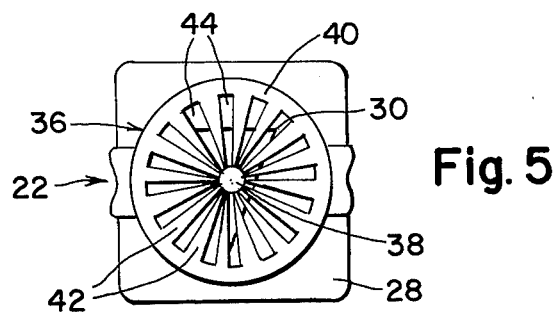
FIG. 5 shows a plan view of a key of the combination telephone and calculator, according to my invention, with the top member removed.

Referring now to the drawing, FIG. 1 shows the combination telephone set 11 which includes a housing 12, a numeric keyboard 14 disposed on the housing 12 which has at least ten keys 16 disposed thereon, and an electronic calculator 18 contained within the housing 12. The keys 16 are selectably usable as either input means for the telephone set 11 to generate a plurality of tones, or as input means for the calculator 18 for the processing of data. At least ten indicia 20 are disposed on the keys 16, respectively as best seen in FIGS. 2 and 3.

I provide selection means 22, as shown in FIGS. 4, 5, 6 and 8, for reversibly changing at least one of the indicia 20 disposed on at least one of the keys 16 from operation as the input means for the telephone set 11 to another of the indicia 20 for operation as the input means for the calculator 18.

Figure 7:
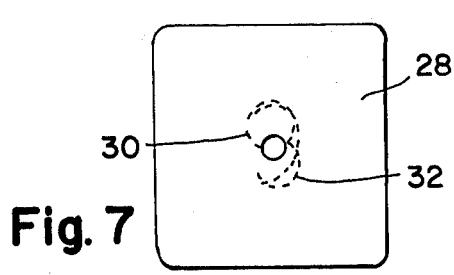
FIG. 7 shows the bottom member of a key.
Figure 6:
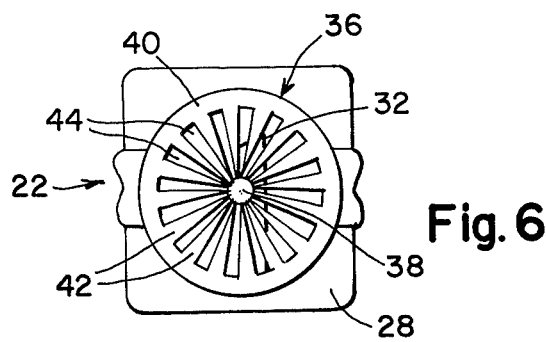
FIG. 6 corresponds to FIG. 5, but with the wheel rotated from a first position to a second position.

At least one of the keys 16 has a central axis 24 and includes a top member 26 and a bottom member 28. The indicia 20 include first and second indicia 30 and 32, respectively as best seen in FIG. 7.

The selection means include a shaft 34 which is coaxially aligned with the axis 24 and is journaled between the members 26 and 28, and a spoked wheel 36 which is rotatable from a first position to a second position, and has a hub 38 and a rim 40. Each spoke 42 of the wheel 36 has the shape of an isosceles triangle, and each opening 44 formed between the spokes 42 has a shape substantially identical to the shape of each spoke. The wheel 36 is fixedly attached to the shaft 34; the top member 26 is transparent and the bottom member 28 has a side facing the top member 26. The bottom member 28 has a broken-line shape of the first and second indicia 30 and 32 disposed thereon. The first and second indicia 30 and 32 respectively, are visible through the transparent top member in the first and second positions of the spoked wheel 36. At least five of the keys 16 are similar to the first key, and the first key and the above-named five keys are disposed on the keyboard 14 so as to form a set 46 of keys which have a common periphery. An endless band 48 is attachable to each wheel of the set of keys 46 for moving the latter from the first position to the second position.

Figure 9:
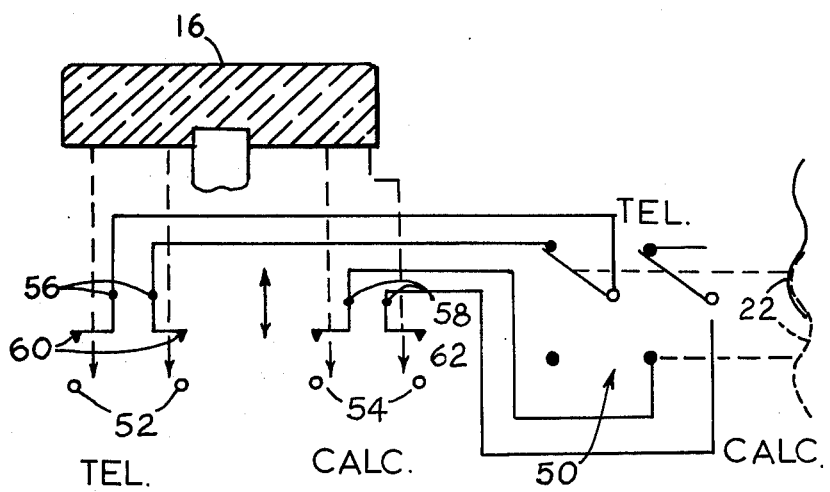
FIG. 9 shows a circuit for selectively activating the telephone and the calculator.

FIG. 9 shows an electrical schematic diagram of how a telephone key is deactivated when the selection means 22 is switched to operation as the input means for the calculator 18, and how the caculator 18 is deactivated when the selection means 22 is switched to operation as input means for the telephone set 11. When contacts 60 make contact with contacts 52, a corresponding telephone circuit is normally activated, and when contacts 62 make contact with contacts 54, a corresponding calculator circuit is normally activated.

Selection means 22 is, for example, coupled for each key 16 to a double pole double throw switch 50. The double pole, double throw switch 50 will be seen to deactivate the calculator key 16 when the selection means 22 is switched to operation as the input means for the telephone set 11, and will be seen to deactivate the telephone key 16 when the selection means 22 is switched for operation as the input means for the calculator 18, since the normal connection between contacts 58, on one hand, and contacts 56, on the other hand, is then broken. It will be understood that depression of the single key 16 causes contact closures of both the telephone contacts 52, for example, and the calculator contacts 54, provided the double pole, double throw switch 50 also closes respective contacts 56 and 58 of the telephone contacts 52, or the calculator key contacts 54 of the key 16, respectively.

It should be understood that the telephone contact 52 and the calculator contact 54 of each key 16 are hard wired to respective telephone and calculator circuitry, and that the operation of any key 16 in any given location is such that a depression of, for example, the numeral 3 when the selection means 22 is switched for telephone operation, causes an appropriate operation of tones or other means from the telephone, while depression of the same key, when the selection means 22 is switched to operation as the input means for the calculator 18, causes the operation of the numeral 7 in the manner intended by the calculator. Therefore, each key will produce a different signal, depending whether the selection means 22 is switched to telephone or calculator operation.

I claim:

1. In a combination telephone set including a housing, a numeric keyboard disposed on the housing having at least ten keys and an electronic calculator contained within said housing, said keys being selectably usable as input means for said telephone set so as to generate a plurality of tones, and for the calculator so as to process data, and wherein at least ten indicia are disposed on the keys, respectively, the improvement comprising selection means for reversibly changing at least one of the indicia disposed on at least one of the keys from operation as the input means for the telephone set to another of the indicia for operation as the input means for the calculator, wherein said at least one of the keys has a central axis and includes top and bottom members, and wherein said indicia include first and second indicia, and said selection means comprise a shaft coaxially aligned with said axis and journaled between said members, and a spoked wheel fixedly attached to said shaft and rotatable from a first position to a second position and having a hub and a rim, each of the spokes of said wheel having the shape of an isosceles triangle, and each of the openings formed between said spokes having a shape substantially identical to the shape of each of said spokes, and wherein said top member is transparent, said bottom member has a side facing said top member and has a broken-line shape of said first and second indicia disposed thereon, whereby said first and said second of said indicia are visible through the transparent top member in said first and second positions of said spoked wheel, respectively.

2. The combination telephone set and calculator according to claim 1 wherein at least five of said ten keys are similar to said at least one of said keys and wherein said at least one of said one keys and said five keys are disposed on said keyboard to form a set of keys having a common periphery, and further including band means attachable to each of said wheels of said set of keys for moving the latter from said first position to said second position.

* * * * *